United States Patent
Durand et al.

(10) Patent No.: US 7,660,341 B2
(45) Date of Patent: *Feb. 9, 2010

(54) RECEIVER DEVICE SUITED TO A TRANSMISSION SYSTEM USING A DIRECT SEQUENCE SPREAD SPECTRUM

(75) Inventors: Benoit Durand, Rousset (FR); Christophe Fraschini, La Garde (FR); Philippe Courmontagne, Belgentier (FR)

(73) Assignees: STMicroelectronics (Rousset) SAS, Rousset (FR); Universite de Provence (AIX Marsielle), Marseille Cedex (FR)

( * ) Notice: Subject to any disclaimer, the term of this patent is extended or adjusted under 35 U.S.C. 154(b) by 558 days.

This patent is subject to a terminal disclaimer.

(21) Appl. No.: 11/429,392

(22) Filed: May 4, 2006

(65) Prior Publication Data
US 2006/0256845 A1 Nov. 16, 2006

(30) Foreign Application Priority Data
May 4, 2005 (FR) ................................... 05 04588
May 4, 2005 (FR) ................................... 05 04589
May 4, 2005 (FR) ................................... 05 04591

(51) Int. Cl.
*H04B 1/00* (2006.01)
(52) U.S. Cl. .................... 375/147; 375/144; 375/148
(58) Field of Classification Search ................ 375/299, 375/347, 142–143, 147–48, 148, 152, 349
See application file for complete search history.

(56) References Cited

U.S. PATENT DOCUMENTS 5,170,411 A * 12/1992 Ishigaki ...................... 375/147

(Continued)

FOREIGN PATENT DOCUMENTS

EP    1 339 167 A    8/2003
FR    2 573 589 A    5/1986

OTHER PUBLICATIONS

J.F. Cavassilas, B. Xerri; "Extension de la notion de filtre adapte. Contribution a la detection de signaux courts en presence de termes perturbateurs", Revue Traitement Du Signal, vol. 10, No. 3, 1992, pp. 215-221, XP002363859.

(Continued)

*Primary Examiner*—Emmanuel Bayard
(74) *Attorney, Agent, or Firm*—Kevin D. Jablonski; Graybeal Jackson LLP

(57) ABSTRACT

A receiver device for a modulated signal, suited in particular to a transmission system using a binary carrier phase modulation by means of a binary message on which a direct sequence spread spectrum operation has been carried out, this device comprising a first analog radio frequency part, transforming the signal received into a low-frequency, demodulated signal, said demodulated signal being applied to a second digital part of said device comprising an analog-to-digital converter and a filter matched to the spreading code used in order to delete the spreading applied to the original message, said device being characterized in that it includes an additional filtering unit, arranged between the analog-to-digital converter and the matched filter, said filtering unit implementing a stochastic matched filtering operation in order to improve the signal-to-noise ratio at the input of said matched filter.

36 Claims, 3 Drawing Sheets

U.S. PATENT DOCUMENTS

| | | | |
|---|---|---|---|
| 5,241,561 | A | 8/1993 | Barnard et al. |
| 5,303,258 | A | 4/1994 | Nakamura et al. |
| 5,490,165 | A * | 2/1996 | Blakeney et al. ............. 370/335 |
| 5,511,099 | A * | 4/1996 | Ko et al. ..................... 375/368 |
| 6,108,317 | A | 8/2000 | Jones et al. |
| 6,134,264 | A | 10/2000 | Shiba et al. |
| 6,393,077 | B1 | 5/2002 | Usui |
| 6,459,743 | B1 | 10/2002 | Lipka |
| 6,864,827 | B1 * | 3/2005 | Tise et al. ................. 342/25 A |
| 7,263,133 | B1 * | 8/2007 | Miao .......................... 375/267 |
| 7,433,382 | B1 | 10/2008 | Miao |
| 2002/0018529 | A1 * | 2/2002 | Dabak et al. ................ 375/267 |
| 2002/0141504 | A1 * | 10/2002 | Suzuki et al. ............... 375/243 |
| 2002/0181614 | A1 | 12/2002 | Mostafa et al. |
| 2004/0125860 | A1 | 7/2004 | Tojo et al. |
| 2004/0131125 | A1 | 7/2004 | Sanderford, Jr. et al. |
| 2006/0018367 | A1 | 1/2006 | Bui |
| 2006/0031274 | A1 * | 2/2006 | Haddadin et al. ........... 708/300 |
| 2006/0208945 | A1 * | 9/2006 | Kolanek ..................... 342/377 |

OTHER PUBLICATIONS

Canales T J et al; "Adaptive Stochastic Filters", Proceedings of the Midwest Symposium on Circuits and Systems, Champaign, Aug. 14-16, 1989, New York, IEEE, US, vol. vol. 1 Symp. 32, Aug. 14, 1989, pp. 609-612, XP000139728.

Lakkis I et al; "Optimum eigenfilters and matched filters", Electronics Letters, IEE Stevenage, GB, vol. 32, No. 22, Oct. 24, 1996, pp. 2068-2070, XP006005913.

Rasmussen J L et al; "An adaptive technique for designing minimum phase models", Signals, Systems and Computers, 1991. 1991 Conference Record of the Twenty-Fifth Asilomar Conference on Pacific Grove, CA, USA Nov. 4-6, 1991, Los Alamitos, CA, USA, IEEE Comput. Soc, US, Nov. 4, 1991, pp. 654-658, XP010026383.

Stewart K A; "Effect of sample clock jitter on IF-sampling Is-95 receivers", Personal, Indoor and Mobile Radio Communications, 1997. Waves of the Year 2000, PIMRC '97., The $8^{th}$ IEEE International Symposium on Helsinki, Finland Sep. 1-4, 1997, New York, NY, USA, IEEE, US, vol. 2, Sep. 1, 1997, pp. 366-370, XP010247670.

Jean-Francois Cavassilas; "Le filtrage adapte stochastique",'Internet Article, 'Online XP002363860 Extrait de l'Internet: URL:http://cava.unit-tln.fr/Adapte.pdf> 'extrait le Jan. 20, 2006!.

French Search Report for FR 0504591 dated Feb. 6, 2006.
French Search Report for FR 0504589 dated Feb. 6, 2006.
French Search Report for FR 0504588 dated Feb. 6, 2006.

* cited by examiner

RECEIVER DEVICE SUITED TO A TRANSMISSION SYSTEM USING A DIRECT SEQUENCE SPREAD SPECTRUM

PRIORITY CLAIM

This application claims priority from French patent application Nos. 0504591, filed May 4, 2005, 0504589 filed May 4, 2005, and 0504588, filed May 4, 2005, which are incorporated herein by reference.

CROSS REFERENCE TO RELATED APPLICATIONS

This application is related to U.S. patent application Ser. Nos. 11/429,452 entitled DIGITAL RECEIVER DEVICE and 11/429,674 entitled DIGITAL RECEIVING DEVICE BASED ON AN INPUT COMPARATOR which have a common filing date and owner and which are incorporated by reference.

TECHNICAL FIELD

In a general way, an embodiment of the invention relates to the processing of digital signals and, in particular, the techniques for decoding such signals in applications involving digital radio frequency communication.

An embodiment of the invention relates more precisely to a receiver device, suited in particular to a transmission system using binary carrier phase modulation (BPSK, for "Binary Phase Shift Keying") by means of a binary message on which a direct sequence spread spectrum (DSSS) operation has been carried out.

BACKGROUND

In a system for transmitting a digital signal using a direct sequence spread spectrum, the "0" and "1" bits are encoded with respective symbols sent by the transmitter, and decoded at the receiver by a finite impulse response (FIR) filter.

In the case where the bits are encoded using a spreading code of length N, the symbols encoding the "0" and "1" bits are each in the form of a series of N symbol elements ("0" or "1"), called "chips", distributed over either of two different levels and transmitted at a predetermined fixed frequency F.

The N symbol elements encoding the "1" bit are anti-correlated to the corresponding N symbol elements encoding the "0" bit, i.e., the symbol elements of the same rank within both of these two symbols have opposite values.

For example, if and when a symbol element of the symbol encoding the "1" bit is at level 1, the corresponding symbol element of the symbol encoding the "0" bit is at level −1. In the same way, if and when a symbol element of the symbol encoding the "1" bit is at level −1, the corresponding symbol element of the symbol encoding the "0" bit is at level 1.

The spread binary message is then used to phase-modulate the carrier, appearing in the form of a time-dependent sine wave recorded as $p(t)=\cos(2\Pi fp.t+\phi)$, where fp is its frequency and $\phi$ its original phase.

FIG. 1 shows the architecture of a BPSK synchronous receiver chain. This architecture conventionally leads to interfacing analog radio modules with a digital processing system working at a near-zero frequency. The information processing is then carried out at this frequency, which advantageously makes it possible to use analog-to-digital converters working at lower frequencies. In this way, when the digital signal reaches the receiver, it is captured by an antenna 10, and then transmitted to the analog unit of the chain, comprising the low-noise amplifier 20 (LNA), the local oscillator 31 as well as the mixer 30. Since the operation of these elements is not modified within the framework of the subsequently described embodiments of the invention, these elements will not be described in greater detail.

It will simply be noted that the mixer 30, receiving at its first input the signal from the output of the amplifier LNA, receives at its second input, connected to the local oscillator 31, a frequency corresponding to the carrier frequency of the signal. This has the effect of bringing the signal back to baseband. Thus, at the output of the mixer, there is a binary message in continuous baseband form, added to a high-frequency component centered over twice the carrier frequency. As a matter of fact, this demodulation operation reveals the spectral motif of the baseband signal, but also a motif at twice the demodulation frequency, i.e., at about the frequency 2 fp.

A low pass filtering stage 40 at the output of the mixer 30 makes it possible to eliminate the harmonic distortion due to spectral redundancy during demodulation of the signal. In order to accomplish this, the low pass filter 40 has a cut-off frequency equal to the maximum frequency of the spread baseband message, which means that only the baseband message is found at its output, i.e., brought back to approximately zero frequency.

The resulting signal is then digitized by the analog-to-digital converter (ADC) 50. It is sampled at a sampling frequency respecting Shannon's limit. In other words, the sampling frequency is assumed to be equal to at least twice the maximum frequency presented by the spectral power density of the spread baseband message.

At the output of the ADC, the DSSS decoder comprises a matched filter stage 60, making it possible to recover the synchronization of the signal being decoded with respect to the wanted information. More precisely, this is a finite impulse response (FIR) filter, characterized by its impulse response coefficients $\{a_i\}_{i=0,1,\ldots,n}$. The matched filter-based decoding process consists in matching the series of coefficients $a_i$ to the exact replica of the spreading code selected. For example, if the Barker code 7 (−1−1−1 1 1−1 1) was used, the coefficients of the matched filter are −1−1−1 1 1−1 1.

The structure of the matched filter 60, described in FIG. 2, is that of a shift register REG receiving each sample of the input signal IN. The filter is synchronized to the same sampling frequency as that of the incoming signal. The shift register includes N bistable circuits in the case of symbols with N symbol elements, which cooperate with a combinational circuit COMB, designed in a manner known by those skilled in the art and involving the series of coefficients $a_i$ such that the output signal OUT produced by the filter has an amplitude directly dependent upon the level of correlation observed between the sequence of the N last samples captured by this filter and the series of the N symbol elements of one of the two symbols, e.g., the series of the N elements of the symbol encoding a "1" bit of the digital signal.

Thus, the matched filtering operation comprises matching the series of coefficients $a_i$ to the exact replica of the selected spreading code, in order to correlate the levels of the symbol elements that it receives in succession at its input to the levels of the successive symbol elements of one of the two symbols encoding the "0" and "1" bits, e.g., the symbol elements of the symbol encoding the "1" bit.

The output of the finite response filter 60 typically supplies synchronization peaks, whose sign provides the bit value of the original message at that moment: if the peak is negative, said value is a "0", and a "1" if the peak is positive. In order to transform the symbols thus decoded into a binary data flow corresponding to the original message and to associate them with synchronization clock, these peaks are passed through hysteresis comparators, Comp1 and Comp2, respectively. The original message as well as the synchronization clock are then restored at the output of the hysteresis comparators.

More precisely, the first comparator Comp1 toggles as soon as the signal passes below a lower threshold value or above an upper threshold value, and then supplies a one-bit digital signal corresponding to the data. The second comparator toggles as soon as the signal passes above or below the lower threshold value, and then supplies a one-bit digital signal which serves as a capture clock for the data. The lower and upper threshold values are adjustable.

However, when the transmission channel is noisy, a significant degradation in the performance of the matched filter-based decoding process DSSS may be observed and, most often, when the wanted signal and the transmission channel noise are not completely decorrelated. In this context, errors may occur, both with respect to the restored binary message and the synchronization clock. Thus, a deterioration in the performance of the matched filter may be observed and, as a result, a significant increase in the bit error rate at the output of the decoding process, along with the reduction in the signal-to-noise ratio.

In order to attempt to improve the performance of the receiver device as it was just described, when in the presence of a noisy transmission channel, various solutions might be anticipated. In particular, it might be anticipated to increase the power of the signal upon transmission, which, however, involves a consequential increase in the electrical power consumed by the circuit. It might also be anticipated to use larger spectrum-spreading codes, but this might be detrimental to the speed, which would thereby be greatly reduced. Consequently, none of these solutions are satisfactory.

SUMMARY

An embodiment of the invention eliminates the disadvantages cited by proposing an improved BPSK receiver device, capable of correctly decoding a digital signal, even in the presence of interfering noise. In other words, this embodiment reduces the error rate at the output of the decoding process for the same signal-to-noise ratio at the input of the receiver device.

An embodiment of the invention also relates to a digital processing device for a modulated signal, suited in particular to a transmission system using binary carrier phase modulation by means of a binary message on which a direct sequence spread spectrum operation has been carried out, this device comprising an analog-to-digital converter and a filter matched to the spreading code used to delete the spreading applied to the original message, said device being characterized in that it includes an additional filtering unit arranged between the analog-to-digital converter and the matched filter, said filtering unit implementing a stochastic matched filtering operation for improving the signal-to-noise ratio at the input of said matched filter.

Advantageously, the additional filtering unit includes a plurality Q of digital finite impulse response base filters mounted in parallel, each of which receives the sampled signal ($S_{in}$) supplied at the output of the analog-to-digital converter, each filter being characterized by a set of K coefficients, this number K being determined such that it corresponds to the minimum number of samples for describing one bit of the spread message, the coefficients of each of the Q filters corresponding respectively to the components of the Q eigen vectors associated with at least the Q eigenvalues greater than 1 of the matrix $B^{-1}A$ where B is the variance-covariance matrix of the resultant noise after demodulation and A the variance-covariance matrix of the wanted signal.

In an embodiment, for each filter of the plurality Q of finite response filters, the additional filtering unit includes means for multiplying the signal obtained at the output of said filter, with, respectively, the vector resulting from the product between the variance-covariance matrix of the noise B and the eigen vector defining the coefficients of said filter, said unit further comprising means of summing up the vectors resulting from all of these operations, supplying a signal corresponding to the output signal of the reformatted analog-to-digital converter having an improved signal-to-noise ratio.

Advantageously, an embodiment of the device includes first and second hysteresis comparators installed at the output of the filter matched to the spreading code, capable of comparing the amplitude of the output signal of the matched filter to a lower threshold value and upper threshold value, and of delivering, respectively, the original binary message and its associated synchronization clock for capturing the data of said message.

In an embodiment, the first and second comparators have adjustable upper and lower threshold values.

According to one embodiment, the filter matched to the spreading code used is a digital finite response filter.

According to the embodiment, the noise corresponds to the transmission channel noise.

BRIEF DESCRIPTION OF THE DRAWINGS

Characteristics and advantages of embodiments of the invention will become more apparent upon reading the following description given by way of a non-limiting, illustrative example and made with reference to the appended figures.

DETAILED DESCRIPTION

Thus, an embodiment of the invention relates to a receiver device, suited in particular to a transmission system using binary carrier phase modulation by means of a binary message on which a direct sequence spread spectrum operation has been carried out. As it has already been described, this device includes a first analog radio frequency part transforming the signal received by the antenna into a low-frequency demodulated signal, and a second digital part with analog-to-digital signal conversion means 50 and decoding means 60 making it possible to delete the spreading applied to the original message.

This device is thus designed to receive and decode a digital input signal composed of bits each of which, based on its value "1" or "0", is represented by either of two symbols where each symbol comprises a series of N symbol elements, distributed over either of two different levels. These symbols, for example, may respond to a Barker code.

These symbol elements are delivered at a predetermined fixed frequency F corresponding to a determined period T=1/

F, and the N symbol elements of the symbol encoding the "1" bit are anti-correlated to the corresponding N symbol elements of the symbol encoding the "0" bit.

In order to make it possible to improve the performance of the matched filter-based decoding process and to thus increase the robustness of the receiver chain towards noise, an embodiment of the invention proposes adding to the already described chain structure an additional filtering unit, provided for maximizing the signal-to-noise ratio before the signal passes into the matched filter 60, which is used for synchronization recovery.

Figure 3:
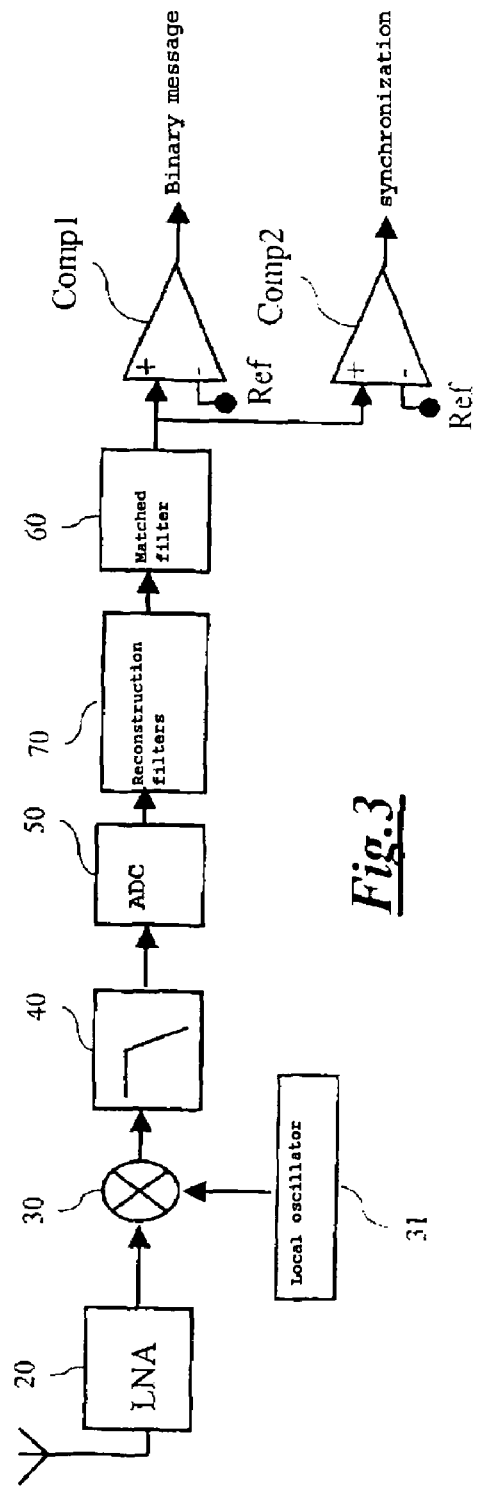
FIG. 3 is a schematic illustration of a modified synchronous BPSK receiver chain according to an embodiment of the invention.
Figure 2:
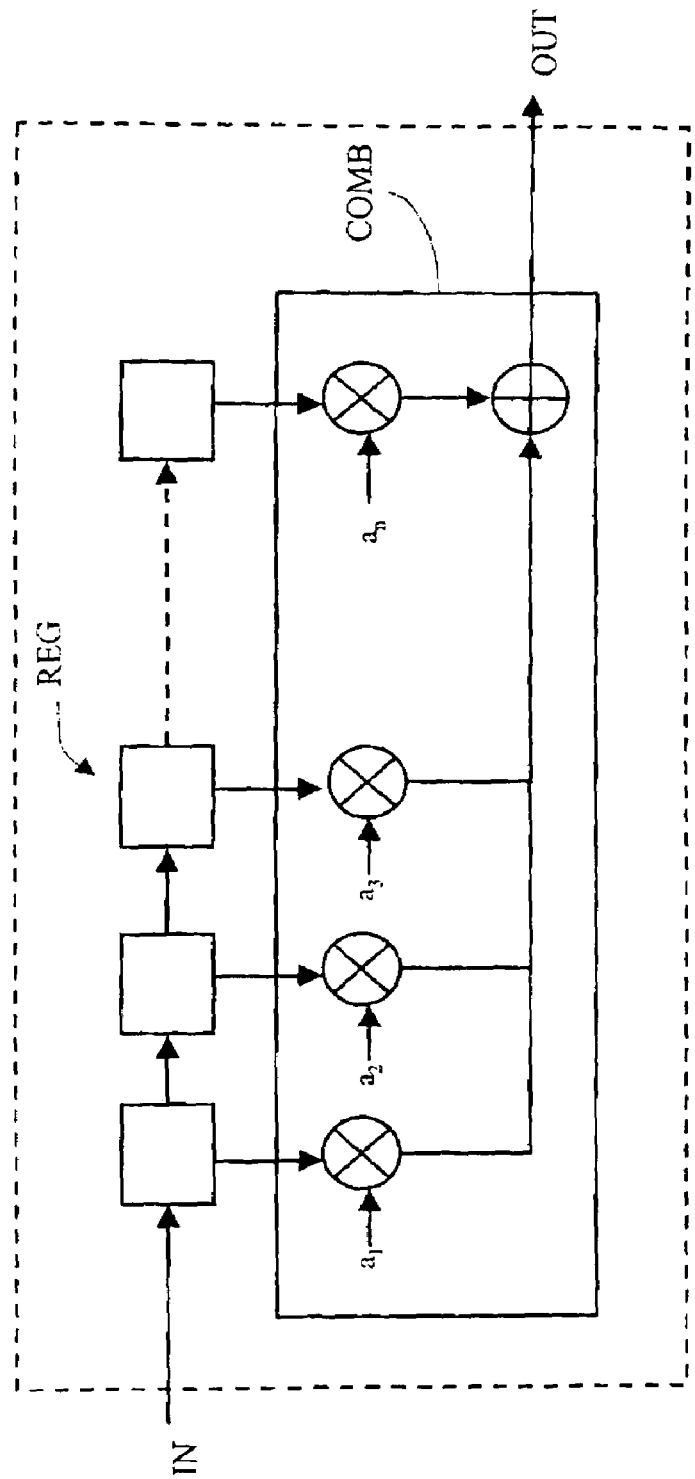
FIG. 2 is a schematic illustration of the structure of a conventional finite response filter matched to the spreading code used and implemented in the device of FIG. 1.

Therefore, as indicated in FIG. 3, the BPSK receiver device according to an embodiment of the invention substantially includes, in addition to the elements already described, an additional filtering unit such as 70, provided for being positioned between the ADC 50 and the matched filter 60. This additional filtering unit comprises a plurality of filters called reconstruction filters, in that they are matched to the signal while at the same time being mismatched to the noise.

The addition of this additional filtering unit 70, arranged at the output of the ADC 50 and upstream from the matched filter 60, thus has the function of impeding the increase of transmission channel noise power. A purpose in using this filter is an improvement in the signal-to-noise ratio prior to the signal passing into the matched filter 60. In order to accomplish this, as will be explained in greater detail herein below, the reconstruction filter unit 70 is based on a filtering technique known by the name of stochastic matched filtering.

Figure 4:
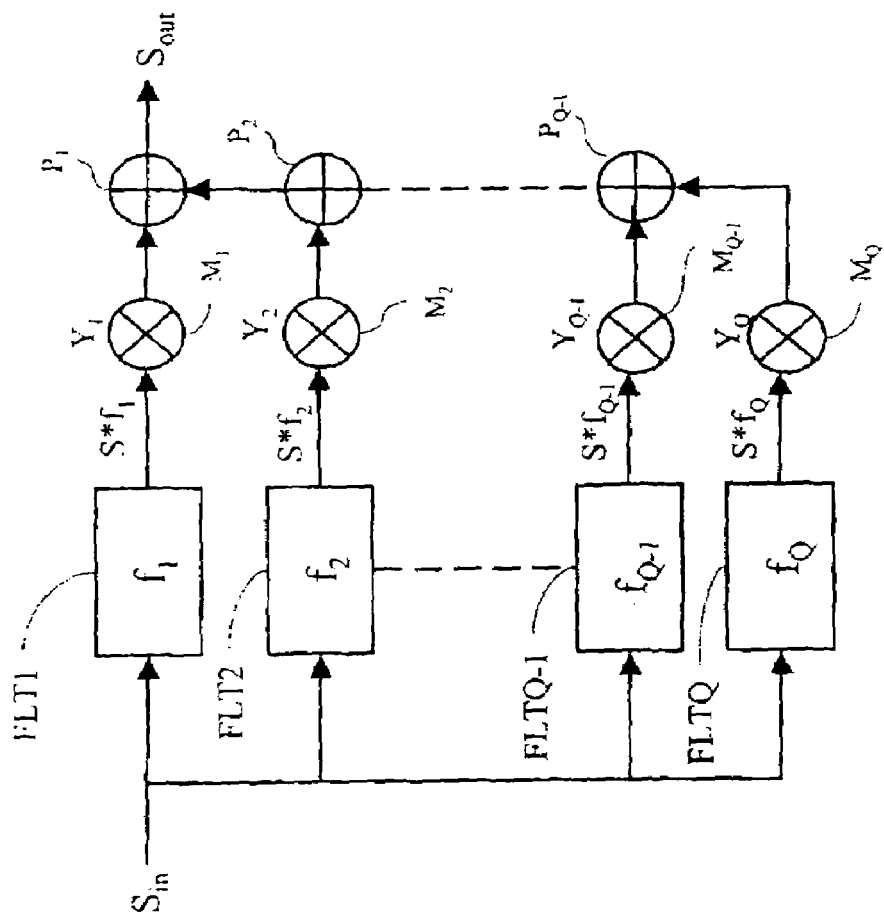
FIG. 4 shows an embodiment of the additional filtering unit at the output of the ADC of FIG. 3 and upstream from the matched filter according to an embodiment of the invention.

According to this filtering technique, the reconstruction filters comprise a bank of Q digital filters FLT1 to FLTQ, as shown in FIG. 4, mounted in parallel and provided for being matched to the signal while at the same time being mismatched to the noise.

As concerns the principle of a stochastic matched filter, if s(t) and b(t) are considered to be two centered random signals, i.e., zero mathematical expectation, and if it is assumed that s(t) is the signal deemed to be of interest, and that b(t) is the interfering signal with a signal-to-noise ratio defined as being the ratio of the power of s(t) over the power of b(t), then the stochastic matched filtering comprises a set of several filters, where each filter, when applied to the additive mixture s(t)+b(t), improves the signal-to-noise ratio of the mixture.

The number Q of filters FLT1 to FLTQ that are used in the unit 70 depends heavily on the nature of the transmission channel noise. As will be seen further on, the choice of the number Q, in fact, is made so as to obtain the best compromise between the gain in signal-to-noise ratio and the synchronization accuracy.

The order of each of the filters is given by the parameter K, designating the minimum number of samples for describing a bit-time, namely the number of samples taken over a period corresponding to the spreading code. Generally speaking, if d is bit rate and $f_e$ is the sampling frequency:

$$K = \frac{f_e}{d}$$

In one embodiment, the filters FLT1 to FLTQ of order K are finite impulse response filters and their structure is similar to that already described in reference to FIG. 3. Each of these filters, i.e., the filters FLT1 to FLTQ, receives the signal $S_{in}$ being decoded at the same time as the others, as it is supplied at the output of the ADC 50.

Thus, it is appropriate to properly configure the filtering unit 70 by selecting, first of all, the respective coefficients of each of the finite response filters FLT1 to FLTQ, in a way that makes it possible to improve the signal-to-noise ratio upstream from the matched filter 60 in the receiver chain. In order to accomplish this, according to the principles of stochastic matched filtering, the coefficients of these filters will be determined, on the one hand, based on the use of statistical parameters representative of the signal and, on the other hand, the noise.

In practice, the coefficients of each filter actually correspond, respectively, to the components of certain eigen vectors, recorded as $f_1$ to $f_q$, of the matrix $B^{-1}A$, where B is the variance-covariance matrix of the resultant noise after demodulation and A is the variance-covariance matrix of the wanted signal corresponding to the spread message, the dimensions of the matrices A and B being equal to K. The signals resulting from the filtering operations with the filters FLT1 to FLTQ are recorded as S*f1 to S*fQ.

As a matter of fact, the signal received can be represented by a random vector whose components correspond, in practical terms, to the samples of the sampled signal.

Let X be such a random vector with countable embodiments noted as $X^k$. The following notations are adopted:

$$x = \begin{pmatrix} x_1 \\ x_2 \\ \vdots \\ x_n \end{pmatrix} \quad x^k = \begin{pmatrix} x_1^k \\ x_2^k \\ \vdots \\ x_n^k \end{pmatrix}$$

From this point of view, the component $x_i$ is a random number and the component $x_i^k$ is an element of $x_i$ with the probability pk. The coefficients $x_i$ thus correspond to the samples of the sampled signal.

The mathematical expectation of $x_i$, noted as $E\{x_i\}$, is defined as follows:

$$E\{x_i\} = \sum_{k=0}^{\infty} p_k x_i^k$$

This definition thus makes it possible to introduce the mathematical expectation of such a random vector:

$$E\{X\} = \begin{pmatrix} E\{x_1\} \\ E\{x_2\} \\ \vdots \\ E\{x_n\} \end{pmatrix}$$

By definition, it is recalled that the variance-covariance matrix of the random vector X, noted as G, is defined by:
G=$E\{XX^T\}$; with $XX^T$ defining the dyad of the vector X by the vector X, this is also noted as:

$$G = \begin{pmatrix} E\{x_1x_1\} & E\{x_1x_2\} & E\{x_1x_3\} & \cdots & E\{x_1x_n\} \\ E\{x_2x_1\} & E\{x_2x_2\} & E\{x_2x_3\} & \cdots & E\{x_2x_n\} \\ E\{x_3x_1\} & E\{x_3x_2\} & E\{x_1x_3\} & \cdots & E\{x_3x_n\} \\ \vdots & \vdots & \vdots & & \vdots \\ E\{x_nx_1\} & E\{x_nx_2\} & E\{x_nx_3\} & \cdots & E\{x_nx_n\} \end{pmatrix}$$

When the coefficients $x_i$ correspond, as is the case here, to the samples of a stationary random signal, i.e., $E\{x_ix_j\}$ depends only on (j-i), then it is possible to construct the variance-covariance matrix only from the set of coefficients $E\{x_1x_1\}, E\{x_1x_2\}, E\{x_1x_3\}, \ldots, E\{x_1x_n\}$. In this case, these coefficients correspond to the values assumed by the autocorrelation function of the signal observed.

In practice, the calculation of the coefficients of the matrices A and B, respectively, can be performed using the values assumed by the autocorrelation function of the wanted signal and the noise, respectively.

As a matter of fact, the fact of spreading the original message being transmitted will obtain for it certain statistical properties. In particular, one realizes that its autocorrelation function corresponds to the deterministic autocorrelation function of the spreading code used. Advantageously, the autocorrelation function corresponding to the wanted signal is typically identical for a given spreading code, irrespective of the message being transmitted. Thus, when the message being transmitted is always spread with the same code, the autocorrelation function associated with the signal remains fixed, the statistics of the signal actually being more closely linked to the spreading code used than to the signal itself.

Furthermore, it is also assumed that the noise is stationary, i.e., that its statistical characteristics will not vary over time. As a matter of fact, the noise can be characterized, in terms of frequencies, by the bandwidth of the low pass filter 40, of which the cut-off frequency is known. Thus, the autocorrelation function associated with the noise, which is determined in a known manner from the spectral density of the noise at the output of the low pass filter 40, remains invariant. An invariant model is thus obtained for the autocorrelation function of the noise.

By way of reminder, the autocorrelation function of the discrete signal $x_k$, noted as $\Gamma(1)$, is calculated according to the following relationship:

$$\Gamma(l) = E\{x_k x_{k-1}\} = \sum_k pkxkxk - l$$

Using the two autocorrelation functions for the wanted signal and for the noise, the variance-covariance matrices A and B can thus be calculated. The dimensions of the matrices A and B are equal to k, corresponding to the number of samples contained in one bit-time. The eignenvalues and eigen vectors of the matrix $B^{-1}A$ can then be calculated.

More particularly, according to an embodiment, the respective coefficients of the N-order filters FLT1 to FLTQ correspond to the components of the Q eigen vectors associated with at least the Q eigenvalues greater than 1 of the matrix $B^{-1}A$. Thus, these filters each comprise K coefficients.

Mathematically speaking, the coefficients of the filters are the generic coefficients of the eigen vectors $f_n$ defined by the problem having the following eigenvalues:

$Af_n=\lambda_nBf_n$, where A represents the variance-covariance matrix of the wanted signal, and B that of the noise after demodulation.

Only the eigen vectors $f_n$ associated with the eigenvalues $\lambda_n$ greater than one are retained. It follows then, that if Q eigenvalues are greater than 1, the filter bank of the stochastic matched filtering unit will comprise Q filters.

As a matter of fact, all of the eigen vectors of the matrix $B^{-1}A$ associated with eigenvalues greater than 1 are representative of the signal, and all of the eigen vectors of the matrix $B^{-1}A$ associated with eigenvalues lesser than 1 are representative of the noise. In other words, only the eigen vectors of the matrix $B^{-1}A$ associated with eigenvalues greater than 1 improve the signal-to-noise ratio.

Therefore, the signal $S_{in}$ at the output of the ADC is filtered by the Q filters FLT1 to FLTQ arranged in parallel, the coefficients of which correspond to the components of the K-dimension eigen vectors $f_1$ to $f_q$ associated, respectively, with the Q eigenvalues greater than 1 of the matrix $B^{-1}A$. The coefficients $S^*f_n$, with n falling between 1 and Q, thus represent the signal $S_{in}$ filtered by the filters FLT1 to FLTQ.

At this stage, the overall signal-to-noise ratio is improved, but the processing carried out has greatly deformed the original signal. It may then be necessary to reconstruct the signal from the signals $S^*f_n$ with n falling between 1 and Q.

In order to accomplish this, at the output of each filter FLT1 to FLTQ, multiplication means $M_1$ to $M_Q$ enable the signal obtained to be multiplied by vector $y_n$, of length K, obtained from the product between the variance-covariance matrix B of the noise and the previously defined associated vector $f_n$ supplying the coefficients of the filter in question:

$Y_n=Bf_n$, this relationship being understood as the product of the matrix B and the vector $f_n$, with n falling between 1 and Q.

It is to be noted that there will therefore be as many vectors $Y_n$ as filters FLTQ.

Each of the coefficients $S^*f_n$ is therefore multiplied by vector $y_n$, with n falling between 1 and Q. Summation means $P_1$ to $P_{Q-1}$ are then provided in order to sum up the vectors resulting from all of these operations, so as to obtain, at the output, a vector $S_{out}$ of length K, having the formula:

$$Sout = \sum_{n=1}^{Q} S * f_n Y_n$$

The signal $S_{out}$ is thus a reformatted signal having a more favorable signal-to-noise ratio than the signal at the input of the device, the filters FLT1 to FLTQ being optimal in terms of the signal-to-noise ratio. However, it is appropriate to note that the signal-to-noise ratio decreases when Q increases, whereas the accuracy of the synchronization clock decreases with Q. The number Q will thus be selected based on a compromise between the gain in signal-to-noise ratio and thus resistance to interference, and synchronization accuracy.

Figure 1:
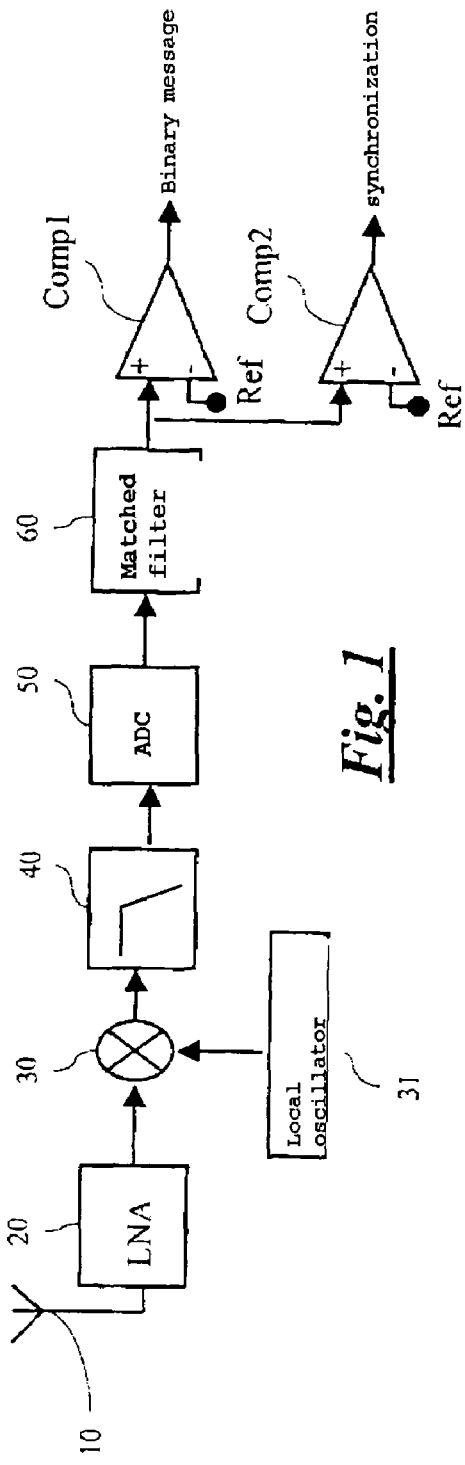
FIG. 1 is a schematic illustration of a conventional synchronous BPSK receiver chain.

An example of a reconstruction filter unit 70 configuration according to an embodiment of the invention is presented hereinafter. In this example, the bit rate is d=142.8 kHz, the spreading code is the Barker code 7. The maximum frequency of the wanted signal is 1 MHz, the sampling frequency is fe=4 MHz, the size of the filters is thus K=28. The noise in question is that of the channel (narrowband additive noise centered around the carrier frequency having a bandwidth equal to that of the spread message) after demodulation. This noise mixture was processed using the conventional chain (FIG. 1), on the one hand, and with the chain including the reconstruction filter unit based on the stochastic matched filtering technique (FIG. 3), on the other hand. The signal-to-noise ratio in the channel was fixed at 0 dB.

The calculation of the coefficients of the matrices A and B, respectively, can thus be performed using the values assumed by the autocorrelation function of the wanted signal and the noise, respectively.

The eigenvalues and eigen vectors of the matrix $B^{-1}A$ having been calculated, an acceptable compromise between synchronization clock accuracy and gain in signal-to-noise ratio results in selection of the five eigen vectors $f_1$ to $f_5$ corresponding to the five largest eigenvalues of the matrix $B^{-1}A$, which gives five filters FLTQ (Q=5) in the filtering unit 70. The 28 coefficients of each of the filters FLT1 to FLT5 are then given by components of each of the eigen vectors $f_1$ to $f_5$. The vectors $Y_1$ to $Y_5$ were calculated using the eigen vectors $f_1$ to $f_5$. The coefficients of the vectors $f_1$ to $f_5$ as well as those of the vectors $Y_1$ to $Y_5$ are presented in the table below:

|  | $f_1$ | $f_2$ | $f_3$ | $f_4$ | $f_5$ |  | $Y_1$ | $Y_2$ | $Y_3$ | $Y_4$ | $Y_5$ |
|---|---|---|---|---|---|---|---|---|---|---|---|
| $a_1$ | −0.26 | −0.14 | −0.21 | −0.12 | 0.03 | $a_1$ | −0.22 | −0.11 | −0.16 | −0.12 | 0.01 |
| $a_2$ | −0.27 | −0.14 | −0.27 | −0.17 | 0.06 | $a_2$ | −0.29 | −0.16 | −0.27 | −0.19 | 0.05 |
| $a_3$ | −0.20 | −0.11 | −0.30 | −0.20 | −0.11 | $a_3$ | −0.19 | −0.12 | −0.29 | −0.21 | 0.10 |
| $a_4$ | −0.04 | −0.03 | −0.28 | −0.21 | 0.15 | $a_4$ | −0.01 | −0.03 | −0.25 | −0.21 | −0.15 |
| $a_5$ | 0.12 | 0.07 | −0.22 | −0.19 | 0.20 | $a_5$ | 0.14 | 0.07 | −0.20 | −0.20 | 0.19 |
| $a_6$ | 0.23 | 0.18 | −0.14 | −0.16 | 0.23 | $a_6$ | 0.23 | 0.18 | −0.14 | −0.16 | 0.24 |
| $a_7$ | 0.24 | 0.27 | −0.04 | −0.10 | 0.26 | $a_7$ | 0.24 | 0.28 | −0.04 | −0.10 | 0.26 |
| $a_8$ | 0.16 | 0.32 | 0.05 | −0.03 | 0.28 | $a_8$ | 0.16 | 0.33 | 0.05 | −0.03 | 0.28 |
| $a_9$ | 0.02 | 0.32 | 0.13 | 0.05 | 0.27 | $a_9$ | 0.02 | 0.32 | 0.13 | 0.05 | 0.27 |
| $a_{10}$ | −0.12 | 0.26 | 0.18 | 0.13 | 0.25 | $a_{10}$ | −0.12 | 0.26 | 0.18 | 0.13 | 0.25 |
| $a_{11}$ | −0.22 | 0.15 | 0.21 | 0.20 | 0.21 | $a_{11}$ | −0.22 | 0.16 | 0.21 | 0.20 | 0.21 |
| $a_{12}$ | −0.25 | 0.03 | 0.19 | 0.25 | 0.16 | $a_{12}$ | −0.24 | 0.03 | 0.19 | 0.25 | 0.16 |
| $a_{13}$ | −0.19 | −0.09 | 0.13 | 0.29 | 0.10 | $a_{13}$ | −0.19 | −0.09 | 0.13 | 0.29 | 0.10 |
| $a_{14}$ | −0.07 | −0.16 | 0.05 | 0.31 | 0.03 | $a_{14}$ | −0.07 | −0.15 | 0.04 | 0.31 | 0.03 |
| $a_{15}$ | 0.07 | −0.16 | −0.05 | 0.31 | −0.03 | $a_{15}$ | 0.07 | −0.15 | −0.04 | 0.31 | −0.03 |
| $a_{16}$ | 0.19 | −0.09 | −0.13 | 0.29 | −0.10 | $a_{16}$ | 0.19 | −0.09 | −0.13 | 0.29 | −0.10 |
| $a_{17}$ | 0.25 | 0.03 | −0.19 | 0.25 | −0.16 | $a_{17}$ | 0.24 | 0.03 | −0.19 | 0.25 | −0.16 |
| $a_{18}$ | 0.22 | 0.15 | −0.21 | 0.20 | −0.21 | $a_{18}$ | 0.22 | 0.16 | −0.21 | 0.20 | −0.21 |
| $a_{19}$ | 0.12 | 0.26 | −0.18 | 0.13 | −0.25 | $a_{19}$ | 0.12 | 0.26 | −0.18 | 0.13 | −0.25 |
| $a_{20}$ | −0.02 | 0.32 | −0.13 | 0.05 | −0.27 | $a_{20}$ | −0.02 | 0.32 | −0.13 | 0.05 | −0.27 |
| $a_{21}$ | −0.16 | 0.32 | −0.05 | −0.03 | −0.28 | $a_{21}$ | −0.16 | 0.33 | −0.05 | −0.03 | −0.28 |
| $a_{22}$ | −0.24 | 0.27 | 0.04 | −0.10 | −0.26 | $a_{22}$ | −0.24 | 0.28 | 0.04 | −0.10 | −0.26 |
| $a_{23}$ | −0.23 | 0.18 | 0.14 | −0.16 | −0.23 | $a_{23}$ | −0.23 | 0.18 | 0.14 | −0.16 | −0.24 |
| $a_{24}$ | −0.12 | 0.07 | 0.22 | −0.19 | −0.20 | $a_{24}$ | −0.14 | 0.07 | 0.20 | −0.20 | −0.19 |
| $a_{25}$ | 0.04 | −0.03 | 0.28 | −0.21 | −0.15 | $a_{25}$ | 0.01 | −0.03 | 0.25 | −0.21 | −0.15 |
| $a_{26}$ | 0.20 | −0.11 | 0.30 | −0.20 | −0.11 | $a_{26}$ | 0.19 | −0.12 | 0.29 | −0.21 | −0.10 |
| $a_{27}$ | 0.27 | −0.14 | 0.27 | −0.17 | −0.06 | $a_{27}$ | 0.29 | −0.16 | 0.27 | −0.19 | −0.05 |
| $a_{28}$ | 0.26 | −0.14 | 0.21 | −0.12 | −0.03 | $a_{28}$ | 0.22 | −0.11 | 0.16 | −0.12 | −0.01 |

Measurements of the signal-to-noise ratio at the output of the matched filter were taken:

5.82 dB for the conventional processing chain, and 8.84 dB for the chain according to an embodiment of the invention integrating the reconstruction filters configured using the values of the example above.

With a filtering unit 70 configuration according to the values in the table, a significant improvement in the signal-to-noise ratio can be observed. As a matter of fact, the gain in terms of signal-to-noise ratio is 3 dB, which, in the case studied, corresponds to a division by one hundred of the bit error rate at the output of the decoding process.

An electronic system, such as a cell phone or wireless LAN, may incorporate the read chain, i.e., channel, of FIG. 3 according to an embodiment of the invention.

From the foregoing it will be appreciated that, although specific embodiments of the invention have been described herein for purposes of illustration, various modifications may be made without deviating from the spirit and scope of the invention.

The invention claimed is:

1. Receiver device for a modulated signal, suited in particular to a transmission system using a binary carrier phase modulation by means of a binary message on which a direct sequence spread spectrum operation has been carried out, this device comprising a first analog radio frequency part, transforming the signal received into a low-frequency, demodulated signal, said demodulated signal being applied to a second digital part of said device comprising an analog-to-digital converter and a filter matched to the spreading code used in order to delete the spreading applied to the original message, said device being characterized in that it includes an additional filtering unit, arranged between the analog-to-digital converter and the matched filter, said filtering unit implementing a stochastic matched filtering operation in order to improve the signal-to-noise ratio at the input of said matched filter.

2. Receiver device as claimed in claim 1, wherein the additional filtering unit includes a plurality Q of digital, finite impulse response base filters mounted in parallel, each of which receives an undersampled sampled signal supplied at the output of the analog-to-digital converter, each filter being characterized by a set of K coefficients, this number K being determined such that it corresponds to the minimum number of samples for describing one bit of the spread message, the coefficients of each of the Q filters corresponding respectively to components of Q eigen vectors associated with at least Q eigenvalues greater than 1 of the matrix $B^{-1}A$, where B is a variance-covariance matrix of the resultant noise after demodulation and A is a variance-covariance matrix of the wanted signal.

3. Receiver device as claimed in claim 2, wherein for each filter of the plurality Q of finite impulse response filters, the additional filtering unit includes means for multiplying the signal obtained at the output of said filter, with, respectively, the vector resulting from the product between the variance-covariance matrix of the noise B and the eigen vector defining the coefficients of said filter, said unit further comprising means of summing up the vectors resulting from all of these operations, supplying a signal corresponding to the output signal of the reformatted analog-to-digital converter having an improved signal-to-noise ratio.

4. Receiver device as claimed in claim 1, further comprising first and second hysteresis comparators installed at the output of the filter matched to the spreading code, capable of comparing the amplitude of the output signal of the matched filter to a lower threshold value and upper threshold value, and of delivering, respectively, the original binary message and its associated synchronization clock for capturing the data of said message.

5. Receiver device as claimed in claim 4, wherein the first and second comparators have adjustable upper and lower threshold values.

6. Receiver device as claimed in claim 1, wherein the filter matched to the spreading code used is a finite impulse response filter.

7. Receiver device as claimed in claim 1, wherein the noise corresponds to the transmission channel noise.

8. A receiver, comprising:
a demodulator operable to recover from a modulated analog signal a demodulated analog signal including a first component having a frequency spectrum spread according to a spreading code and including a second component;
an analog-to-digital converter coupled to the demodulator and operable to convert the demodulated analog signal into a demodulated digital signal including the digitized first and second components having respective strengths;
an emphasizer coupled to the converter and operable to generate a modified demodulated digital signal from the demodulated digital signal by increasing the strength of the digitized first component of the demodulated digital signal relative to the strength of the digitized second component; and
a de-spreader coupled to the emphasizer and operable to generate a digital baseband signal from the modified demodulated digital signal and the spreading code.

9. The receiver of claim 8 wherein the second component of the modulated analog signal comprises a noise component.

10. The receiver of claim 8, further comprising:
an amplifier coupled to the demodulator and operable to receive and amplify the modulated analog signal; and
wherein the demodulator is operable to recover the demodulated analog signal from the amplified modulated analog signal.

11. The receiver of claim 8 where the demodulator comprises:
an oscillator operable to generate a demodulation signal having a frequency substantially equal to a carrier frequency associated with the modulated analog signal; and
a mixer coupled to the oscillator, operable to receive the modulated analog signal, and operable to generate the demodulated analog signal as a product of the modulated analog signal and the demodulation signal.

12. The receiver of claim 8, further comprising:
wherein the first component of the demodulated analog signal has a bandwidth; and
a low-pass filter coupled between the demodulator and the analog-to-digital converter and operable to limit the bandwidth of the demodulated analog signal to substantially the bandwidth of the first component.

13. The receiver of claim 8, further comprising:
wherein the baseband digital signal comprises an amplitude; and
a comparator coupled to the de-spreader and operable to generate a binary signal having a first level if the amplitude of the baseband digital signal is greater than a first threshold and having a second level if the amplitude of the baseband digital signal is less than a second threshold.

14. The receiver of claim 8 wherein the emphasizer comprises:
a finite-impulse-response filter operable to generate an intermediate signal from the demodulated digital signal; and
a multiplier coupled to the filter and operable to generate the modified demodulated digital signal from a product of the intermediate signal and a predetermined value.

15. The receiver of claim 8 wherein the emphasizer comprises:
finite-impulse-response filters each operable to generate a respective first intermediate signal from the demodulated digital signal;
multipliers each coupled to a respective filter and each operable to generate a respective second intermediate signal equal to a product of a respective first intermediate signal and a respective predetermined value; and
an adder circuit operable to generate the modified demodulated digital signal from a sum of the second intermediate signals.

16. The receiver of claim 8 wherein:
the first component of the demodulated digital signal has a symbol rate;
the analog-to-digital converter operates at a sampling rate; and
the emphasizer comprises,
a finite-impulse-response filter having an order related to a quotient of the sampling rate divided by the symbol rate and operable to generate an intermediate signal from the demodulated digital signal, and
a multiplier coupled to the filter and operable to generate the modified demodulated digital signal from a product of the intermediate signal and a predetermined value.

17. The receiver of claim 8 wherein the emphasizer comprises:
a finite-impulse-response filter having one or more coefficients related to an autocorrelation of the spreading code and operable to generate an intermediate signal from the demodulated digital signal; and
a multiplier coupled to the filter and operable to generate the modified demodulated digital signal from a product of the intermediate signal and a predetermined value.

18. The receiver of claim 8 wherein the emphasizer comprises:
a finite-impulse-response filter having one or more coefficients related to an autocorrelation of the second component of the demodulated analog signal and operable to generate an intermediate signal from the demodulated digital signal; and
a multiplier coupled to the filter and operable to generate the modified demodulated digital signal from a product of the intermediate signal and a predetermined value.

19. The receiver of claim 8 wherein the emphasizer comprises:
a finite-impulse-response filter having coefficients related to elements of an eigen vector of a product of a variance-covariance matrix of the spreading code and a transpose of a variance-covariance matrix of the second component of the demodulated analog signal, the eigen vector being associated with an eigen value of the product greater than one, the filter operable to generate an intermediate signal from the demodulated digital signal; and
a multiplier coupled to the filter and operable to generate the modified demodulated digital signal from a product of the intermediate signal and a vector value related to a product of the variance-covariance matrix of the second component of the demodulated analog signal and the eigen vector.

20. The receiver of claim 8 wherein the emphasizer comprises:
a finite-impulse-response filter having coefficients respectively equal to elements of an eigen vector of a product of a variance-covariance matrix of the spreading code and a transpose of a variance-covariance matrix of the second component of the demodulated analog signal, the eigen vector being associated with an eigen value of the product greater than one, the filter operable to generate an intermediate signal from the demodulated digital signal; and
a multiplier coupled to the filter and operable to generate the modified demodulated digital signal as a vector equal to a product of the intermediate signal and a vector value equal to a product of the variance-covariance matrix of the second component of the demodulated analog signal and the eigen vector.

21. A system, comprising:
a receiver, comprising,
a demodulator operable to recover from a modulated analog signal a demodulated analog signal including a first component having a frequency spectrum spread according to a spreading code and including a second component,
an analog-to-digital converter coupled to the demodulator and operable to convert the demodulated analog signal into a demodulated digital signal including the digitized first and second components having respective strengths,
an emphasizer coupled to the converter and operable to generate a modified demodulated digital signal from the demodulated digital signal by increasing the strength of the digitized first component of the demodulated digital signal relative to the strength of the digitized second component, and
a de-spreader coupled to the emphasizer and operable to generate a digital baseband signal from the modified demodulated digital signal and the spreading code.

22. A method, comprising:
receiving a modulated analog signal at a receiver;
demodulating the modulated analog signal, the demodulated analog signal including a first component having a frequency spectrum spread according to a spreading code and including a second component;
converting the demodulated analog signal into a demodulated digital signal including the digitized first and second components having respective power levels;
modifying the demodulated digital signal by lowering the power level of the digitized second component relative to the power level of the digitized first component;
de-spreading the modified demodulated digital signal using the spreading code; and
outputting the digital baseband signal at an output of the receiver.

23. The method of claim 22, further comprising:
receiving the analog signal from a propagation channel; and
wherein the second component of the demodulated analog signal comprises noise from the channel.

24. The method of claim 22, further comprising limiting the bandwidth of the demodulated analog signal to substantially the bandwidth of the first component before converting the demodulated analog signal.

25. The method of claim 22, further comprising generating a binary signal having a first level if the amplitude of the de-spread signal is greater than a first threshold and having a second level if the amplitude of the de-spread signal is less than a second threshold.

26. The method of claim 22 wherein the first threshold equals the second threshold.

27. The method of claim 22 wherein modifying the demodulated signal comprises:
generating an intermediate signal from the demodulated digital signal using a finite-impulse-response filter; and
generating the modified demodulated digital signal by multiplying the intermediate signal by a predetermined value.

28. The method of claim 22 wherein modifying the demodulated signal comprises:
generating first intermediate signals from the demodulated signal using respective finite-impulse-response filters;
generating second intermediate signals by multiplying each of the first intermediate signals by a respective predetermined value; and
generating the modified demodulated digital signal by summing together the second intermediate signals.

29. The method of claim 22 wherein:
converting the demodulated analog signal comprises converting the demodulated analog signal at a sampling rate;
the first component of the demodulated digital signal has a symbol rate; and
modulating the demodulated digital signal comprises,
generating an intermediate signal from the demodulated digital signal with a finite-impulse-response filter having an order related to a quotient of the sampling rate divided by the symbol rate, and
generating the modified demodulated digital signal by multiplying the intermediate signal by a predetermined value.

30. The method of claim 22 wherein modifying the demodulated signal comprises:
generating an intermediate signal from the demodulated digital signal using a finite-impulse-response filter having one or more coefficients related to an autocorrelation of the spreading code; and
generating the modified demodulated digital signal by multiplying the intermediate signal by a predetermined value.

31. The method of claim 22 wherein modifying the demodulated signal comprises:
generating an intermediate signal from the demodulated digital signal using a finite-impulse-response filter having one or more coefficients related to an autocorrelation of the second component of the demodulated analog signal; and
generating the modified demodulated digital signal by multiplying the intermediate signal by a predetermined value.

32. The method of claim 22 wherein modifying the demodulated signal comprises:
generating an intermediate signal from the demodulated digital signal using a finite-impulse-response filter having one or more coefficients related to an autocorrelation of the second component of the demodulated digital signal; and
generating the modified demodulated digital signal by multiplying the intermediate signal by a predetermined value.

33. The method of claim 22 wherein modifying the demodulated signal comprises:
  generating an intermediate signal from the demodulated digital signal using a finite-impulse-response filter having coefficients related to elements of an eigen vector of a product of a variance-covariance matrix of the spreading code and a transpose of a variance-covariance matrix of the second component of the demodulated analog signal, the eigen vector being associated with an eigen value of the product greater than one; and
  generating the modified demodulated digital signal by multiplying the intermediate signal by a vector value related to a product of the variance-covariance matrix of the second component of the demodulated analog signal and the eigen vector.

34. The method of claim 22 wherein modifying the demodulated signal comprises:
  generating an intermediate signal from the demodulated digital signal using a finite-impulse-response filter having coefficients related to elements of an eigen vector of a product of a variance-covariance matrix of the spreading code and a transpose of a variance-covariance matrix of the second component of the modulated analog signal, the eigen vector being associated with an eigen value of the product greater than one; and
  generating the modified demodulated digital signal by multiplying the intermediate signal by a vector value related to a product of the variance-covariance matrix of the second component of the modulated analog signal and the eigen vector.

35. The method of claim 22 wherein modifying the demodulated signal comprises:
  generating an intermediate signal from the demodulated digital signal using a finite-impulse-response filter having coefficients related to elements of an eigen vector of a product of a variance-covariance matrix of the spreading code and a transpose of a variance-covariance matrix of the second component of the demodulated digital signal, the eigen vector being associated with an eigen value of the product greater than one; and
  generating the modified demodulated digital signal by multiplying the intermediate signal by a vector value related to a product of the variance-covariance matrix of the second component of the demodulated digital signal and the eigen vector.

36. The method of claim 22 wherein modifying the demodulated signal comprises:
  generating an intermediate signal from the demodulated digital signal using a finite-impulse-response filter having coefficients respectively equal to elements of an eigen vector of a product of a variance-covariance matrix of the spreading code and a transpose of a variance-covariance matrix of the second component of the demodulated analog signal, the eigen vector being associated with an eigen value of the product greater than one; and
  generating the modified demodulated digital signal as a vector by multiplying the intermediate signal by a vector value equal to a product of the variance-covariance matrix of the second component of the demodulated analog signal and the eigen vector.

* * * * *

UNITED STATES PATENT AND TRADEMARK OFFICE
CERTIFICATE OF CORRECTION

PATENT NO. : 7,660,341 B2 Page 1 of 1
APPLICATION NO. : 11/429392
DATED : February 9, 2010
INVENTOR(S) : Durand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

Twenty-eighth Day of December, 2010

David J. Kappos
*Director of the United States Patent and Trademark Office*